Patented Jan. 2, 1923.

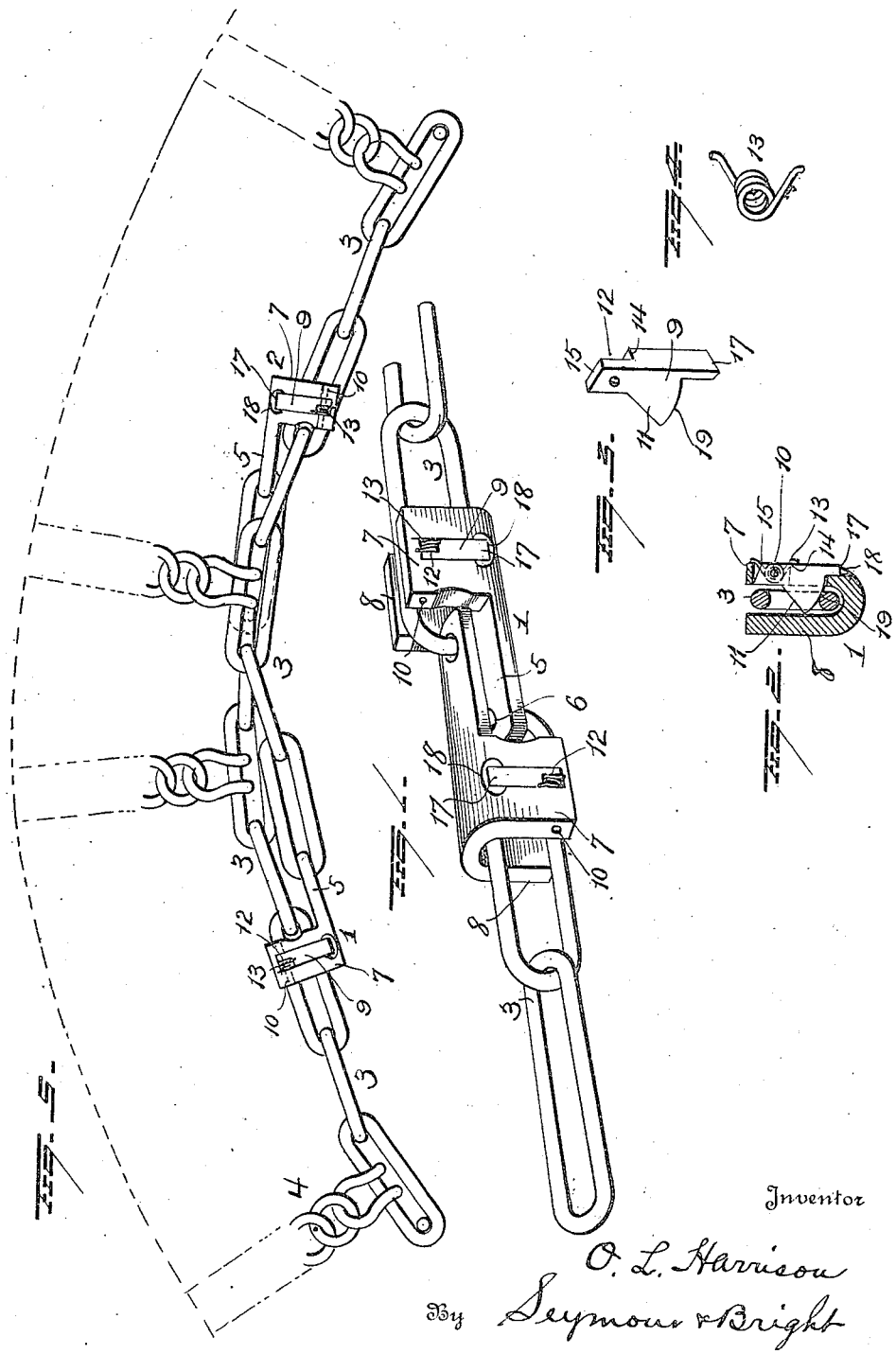

1,440,991

UNITED STATES PATENT OFFICE.

OWEN L. HARRISON, OF COLETA, ILLINOIS.

CONNECTING AND FASTENING MEANS FOR TIRE CHAINS.

Application filed May 24, 1922. Serial No. 563,360.

*To all whom it may concern:*

Be it known that I, OWEN L. HARRISON, a citizen of the United States, and a resident of Coleta, in the county of Whiteside and State of Illinois, have invented certain new and useful Improvements in Connecting and Fastening Means for Tire Chains; and I do hereby declare the following to be a full, clear, and exact description of the invention, such as will enable others skilled in the art to which it appertains to make and use the same.

This invention relates to improvements in connecting and fastening means for tire chains,—one object of the invention being to so construct such means that the same may engage chain links edgewise of the latter; so that spring-pressed pawls which prevent escape of the device from the chain shall be housed; so that the pivot pins of said pawls shall not be subjected to strain; so that pulling strains against the pawls may be obviated, and so that a tire chain provided with my improvements may be quickly applied to a tire.

A further object is to provide connecting and fastening means for tire chains which may be operated to compensate for stretching of the chains or for adjustment of the latter to fit a particular tire, without leaving a loose end of the chain to be cut off or wired to the main body of the chain.

With these and other objects in view, the invention consists in certain novel features of construction and combinations of parts as hereinafter set forth and pointed out in the claims.

In the accompanying drawings, Figure 1 is a view in perspective illustrating my improvements. Figure 2 is a view partly in section of one of the fastener or connector members. Figure 3 is a detail view of one of the pawls. Figure 4 is a view of the pawl spring, and Figure 5 is a view illustrating the manner in which my improvements may be employed to compensate for slack in the chain.

My improved connecting and fastening means comprises two separate members 1 and 2 to be connected respectively to links at respective ends of a side tire chain 2. A link of a cross chain is shown at 4.

The two connecting and fastening members are identical in construction and hence a detail description of one will suffice for both. Each member, 1 and 2, comprises a bar 5 having near one end a hole 6 to receive the link at one end of the chain 3 and is provided at its other end with a U-shaped head formed by stout parallel jaws or ears 7—8 which are so spaced as to receive a chain link edgewise between them. The jaw 7 is provided with a slot in which a pawl 9 is housed and in which said pawl is pivotally supported as indicated at 10. This pawl is made with a part 11 which normally projects across the space between two jaws and passes through a chain link between the ends of the latter,—the lower edge of the part 11 being curved, preferably concentric to the pivot 10. The pawl 9 is recessed as at 12 for the accommodation of a spring 13 which encircles the pivot pin and bears respectively against the shoulder 14 formed by the recess 12 and against the upper end of the slot in the jaw 7, said spring thus tending to normally hold the pawl in its operative position as shown in Figure 2. The upper end of the pawl is made with a beveled face 15 to permit it to be turned on the pivot pin,—one end of said beveled face being adapted to engage the upper wall of the slot in the jaw 7 and thus limit the outward movement of the pawl and the upper end of the pawl at the other end of said curved face being adapted to engage the top wall of said slot when the pawl is in normal position. The lower portion of the pawl 9 forms a finger piece 17 to be engaged by the operator to withdraw said pawl and the outer wall of the jaw 7 is recessed as at 18 to facilitate access to said finger piece. The portion 11 of the pawl is provided with an upper beveled edge 19 so that when the device is applied to a chain link, the lower member of said link will move the pawl outwardly in order that it may pass the same and then the pawl will automatically assume its normal position with the part 11 projecting across the space between the jaws 7—8 and through the link.

When the two members 1 and 2 shall have been attached to links at respective ends of the chain 3 and brought together, the member 2 will be inverted with respect to the member 1 and the latter will be connected with a chain link with which the member 2 is connected and said member 2 will be latched to a chain link with which the member 1 is connected.

With the construction and arrangement of parts above described, all strains to which the members may be subjected will be sustained by the stout jaws forming the heads of the respective members and the pawls as well as their pivotal mountings will not be subjected to any such strains.

By constructing my improvements in two parts secured independently to respective ends of a tire chain and adapted for latched connection with any link near the end portions of the chain, I am enabled to compensate for slack in the chain, due either to the stretching of the same or to the fact that the chain may be too long for use on a particular tire, by connecting the head end of one or both of the members 1, 2 with a link or links removed rearwardly from the links at the extreme ends of the chain. In this manner I am enabled to adjust the chain to take up slack without the objectionable feature of loose chain ends which would have to be cut off or wired to the main body of the chain. It will be understood that each side chain may be provided with one or more pairs of fastener members.

Having fully described my invention what I claim as new and desire to secure by Letters-Patent, is:

1. The combination with a tire chain, of connecting members permanently connected with respective end links of said chain, each of said members provided with spaced jaws to receive between them any link near the chain ends, and latching means carried by a jaw on each member and adapted to enter the link disposed between the jaws.

2. In devices of the character described, the combination of two members for attachment respectively to respective ends of a chain, each of said members comprising a bar for connection to a link at one end of a chain and jaws spaced to receive a chain link edgewise between them, and means carried by one jaw of each member to enter the adjacent chain link.

3. In devices of the character described, the combination of two members for attachment respectively to respective ends of a tire chain, one of said members being inverted relatively to the other member, each of said members comprising a bar for connection to a link at one end of the chain and jaws spaced to receive a chain link edgewise between them, and means carried by one jaw of each member to enter the adjacent chain link.

4. In devices of the character described, the combination of two members for attachment respectively to respective ends of a tire chain, each of said members comprising a bar for connection to a link at one end of the chain and jaws spaced to receive a chain link edgewise between them, and a spring pressed pawl carried by one jaw of each member and adapted to project through a chain link.

5. In devices of the character described, the combination of duplicate members, each comprising a bar adapted at one end for connection with a chain link and provided at its other end with spaced jaws to receive a chain link edgewise between them, one of said jaws having a slot, a pawl pivotally mounted in said slot, and a spring operable normally to retain a part of said pawl across the space between the two jaws.

6. In devices of the character described, the combination of duplicate members for attachment respectively to respective ends of a tire chain, each of said jaws comprising a bar for connection with a link at one end of the chain and provided with spaced jaws to receive a chain link edgewise between them, one of said jaws having a slot, a pawl pivotally mounted in said slot and having a part to project across the space between the jaws, means whereby movement of said pawl may be limited, a spring holding said pawl in normal position, and a finger piece on said pawl to facilitate withdrawing the latter against the resistance of the spring.

In testimony whereof, I have signed this specification in the presence of two subscribing witnesses.

OWEN L. HARRISON.

Witnesses:
W. S. McCLOY,
F. J. BOWMAN.